United States Patent
Lammers et al.

(10) Patent No.: US 6,478,453 B2
(45) Date of Patent: Nov. 12, 2002

(54) LUMINAIRE

(75) Inventors: Liane Lammers, Eindhoven (NL); Johannes Petrus Maria Ansems, Eindhoven (NL); Antonius Johannes Maria Van Hees, Eindhoven (NL); Theodorus Franciscus Mattheus Maria Maas, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 45 days.

(21) Appl. No.: 09/754,170

(22) Filed: Jan. 3, 2001

(65) Prior Publication Data

US 2001/0007527 A1 Jul. 12, 2001

(30) Foreign Application Priority Data

Jan. 7, 2000 (EP) .............................. 00200046

(51) Int. Cl.[7] .............. B60Q 1/06; G03B 3/28; G03B 21/60
(52) U.S. Cl. ............. 362/294; 362/268; 362/373; 353/23; 359/456
(58) Field of Search .............. 362/294, 373, 362/327, 334, 335, 253, 268, 331, 309; 359/443, 448, 223, 455, 456, 457; 353/22, 23, 24, 29, 95, 97, 84

(56) References Cited

U.S. PATENT DOCUMENTS

| | | | | |
|---|---|---|---|---|
| 2,224,178 A | * | 12/1940 | Bitner | 362/327 |
| 2,254,961 A | * | 9/1941 | Harris | 362/327 |
| 4,779,176 A | * | 10/1988 | Bornhorst | 353/84 |
| 5,143,442 A | * | 9/1992 | Ishikawa et al. | 362/253 |
| 5,615,045 A | * | 3/1997 | Takuma et al. | 359/456 |
| 6,039,461 A | * | 3/2000 | Cummings et al. | 362/294 |

FOREIGN PATENT DOCUMENTS

| | | | | |
|---|---|---|---|---|
| EP | 0253081 A1 | 1/1988 | | F21P/5/02 |
| EP | 0253081 B1 | 3/1991 | | F21P/5/02 |
| EP | 0930600 A1 | 7/1999 | | G09F/9/30 |

* cited by examiner

*Primary Examiner*—Sandra O'Shea
*Assistant Examiner*—Bao Truong
(74) *Attorney, Agent, or Firm*—Frank Keegan

(57) ABSTRACT

A luminaire for projecting an image comprises a housing (1) having a light emission window (2). The housing (1) accommodates a light source (3), an optical system (4) for directing light originating from the light source (3) along a longitudinal axis (5), and an image-forming surface (6) which is positioned orthogonally with respect to the longitudinal axis (5). According to the invention, the light source is a LED (3), and the optical system (4) comprises a collimating element (14) for collimating the light originating from the LED (3). Preferably, the luminaire comprises only one LED (3) which, during operation, has a luminous flux of at least 5 lm. Preferably, the housing (1) also comprises a focusing lens (15) for focusing the collimated light originating from the collimating element (14) on the image-forming surface (6) and, preferably, a projection lens (7, 7') for projecting an image of the image-forming surface (6). Preferably, parts of the collimating element show total internal reflection. The luminaire according to the invention is a compact, lightweight, low-energy and low-maintenance luminaire.

20 Claims, 4 Drawing Sheets

LUMINAIRE

FIELD OF THE INVENTION

The invention relates to a luminaire for projecting an image by means of a light beam, comprising
  a housing having a light emission window, which housing accommodates a light source and an optical system for directing the radiation to be generated by the light source along a longitudinal axis, and
  an image-forming surface which is to be placed in the light beam transversely to the longitudinal axis.

BACKGROUND OF THE INVENTION

Such luminaires are known per se. They are used in, inter alia, theater lighting, such as stage lighting, in particular for projecting an image or a silhouette on a stage, screen, background or backcloth. Other applications of these luminaires include the projection of a logo, text or otherwise an image onto a facade of a building or on a road surface, for example in front of a shop window, for example, to attract the attention of a potential customer. Dynamic effects are generally brought about by providing the housing with moving mirrors. In addition, said luminaires generally comprise a plurality of image-forming surfaces, also referred to as GOBOs. In an alternative embodiment, said GOBOs are mounted on rotatable, transparent sheets, so that each time a different GOBO is imaged by the luminaire.

From EP-A 0 253 081, a so-called light pattern generator is known, which is used as theater lighting, wherein a halogen lamp or a metal halide lamp is used as the light source. Using a reflector, the light originating from the light source is turned into a parallel light beam which is focused on an image-forming surface by means of a lens. Subsequently, the image-forming surface is formed into a corresponding image.

Luminaires of the type mentioned above exhibit an important drawback. They often have large dimensions, are comparatively heavy and relatively expensive. In addition, such luminaires require comparatively much maintenance, for example, in that the lamp has to be regularly replaced.

SUMMARY OF THE INVENTION

It is an object of the invention to obviate the above-mentioned drawback. The invention more particularly aims at providing a luminaire of the type mentioned in the opening paragraph, wherein a simpler and cheaper construction is obtained in combination with a comparatively low energy consumption and relatively low maintenance costs.

To achieve this, the luminaire is characterized in accordance with the invention in that the light source comprises at least one light-emitting diode, and the optical system includes a collimating element for collimating the light beam.

Light-emitting diodes (LEDs) have a service life in excess of 60,000 hours, which is much longer than that of the halogen lamp or metal halide lamp used in the known luminaire. In addition, light-emitting diodes have a relatively low energy consumption (approximately 1 Watt instead of 50–200 Watt).

A luminaire having a high optical efficiency is obtained by using opto-electronic elements, also referred to as electro-optic elements, for example electroluminescent elements, such as light-emitting diodes (LEDs) as the light source. As a consequence of this and other factors, the decrease in light output by the use of light-emitting diodes is not proportional to the decrease of the power and the dimensions of the luminaire.

If a plurality of light-emitting diodes are used, they are preferably arranged in an array, with one collimating element being associated with each LED. In an alternative embodiment, the luminaire comprises a plurality of light-emitting diodes associated with a plurality of collimating elements, enabling various images of different colors to be alternately or simultaneously projected. One or more LEDs may be associated with one collimating element. As a result, the use of LEDs has the further advantage that dynamic lighting possibilities are created. If different types of LEDs are combined and/or LEDs of different colors are used, colors can be mixed in a desirable manner and also changes in color can be effected without having to use, for example, a so-called color wheel. To achieve this, a favorable embodiment of the luminaire in accordance with the invention comprises control electronics for changing the luminous flux of the LEDs. This measure enables the desired color effects to be achieved. A suitable combination of LEDs also enables white light to be obtained, and control electronics can be used to set a desired color temperature, which color temperature remains constant during operation of the luminaire. The use of this measure further enables the luminous flux to be dimmed. It is to be noted that the control electronics is customarily accommodated in the housing. In principle, however, the control electronics may be provided outside the housing.

A further drawback of the known luminaire is that, during operation of the luminaire, the light source used emits comparatively much heat, in practice, in the form of IR radiation. In addition, such a light source generates comparatively much UV-radiation. As a result, it proved impossible to use synthetic resin for the optical parts in the luminaire. It has been found that parts of the optical system which are made of synthetic resin are subject to degradation under the influence of the UV-radiation and/or they melt under the influence of the IR-radiation. Therefore, the optical system in the known luminaire is made of glass. Since LEDs generate much less radiation heat and/or UV light than gas discharge lamps or halogen lamps, it is possible in the luminaire in accordance with the invention to use synthetic resin for the parts of the optical system used to direct the radiation generated by the light source. The temperature of the lighting-emitting diode is much lower than that of the lamp in the known luminaire (approximately 50° C. as compared to approximately 200° C.). Furthermore, it is possible to adapt the optical path in the housing of the luminaire to the light source. In addition, optical parts of synthetic resin having the dimensional accuracy necessary for this application can be manufactured relatively readily and inexpensively as compared to glass parts. In this respect, satisfactory results are achieved using optical systems of poly[methylmethacrylate] (PMMA) or of polycarbonate (PC).

By using a collimating element, which surrounds the light-emitting diode, the use of a reflector as in the known luminaire is precluded. The collimating element further causes the light emitted, in operation, by the light-emitting diode to become a parallel light beam. In the collimating element, preferably, both reflection and total internal reflection of light take place, the provision of a reflective coating, as on the reflector in the known luminaire, being precluded.

The luminaire in accordance with the invention is compact, lightweight and has a low energy consumption and low maintenance costs.

An embodiment of the luminaire is characterized in accordance with the invention in that the light source is composed of a single light-emitting diode, the luminous flux of which is at least 5 lm during operation.

An advantage of the use of a single LED is that a very compact luminaire is obtained. At present, so-called high-efficiency, high-output LEDs are commercially available. The luminous flux per LED is at least 10 lm, preferably more than 30 lm per LED. The use of these high-power LEDs enables a luminaire having a very compact housing to be manufactured.

A favorable preferred embodiment of the invented luminaire is characterized in that the LED is mounted on a metal-core printed circuit board. If the LEDs are provided on such a metal-core printed circuit board (MC-PCB), heat generated by the LED or the LEDs can be readily dissipated via the PCB through heat conduction. In the case of a luminaire comprising a light source having only a single LED, the use of a MC-PCB is not necessary.

An interesting embodiment of the luminaire is characterized in accordance with the invention in that the housing is made of metal and provided with cooling fins, and in that the metal-core printed circuit board is in contact with the metal housing via a heat-conducting connection. Such a heat-conducting connection is preferably formed by mounting the MC-PCB on a metal plate which is connected to the metal housing. In this embodiment, the heat generated in the LED or LEDs can be dissipated, by (thermal) conduction, via the MC-PCB and the metal plate to the housing and the cooling fins, resulting in heat being dissipated to the environment. An advantage hereof is that, unlike the known luminaire, forced air cooling to dissipate heat is not necessary. Unlike the light source in the known lamp, where a halogen lamp or a metal halide lamp is used, an LED used as a light source does not emit heat. The heat originating from an LED is dissipated via conduction.

In a preferred embodiment of the luminaire, the optical system further comprises a focusing lens to focus the collimated light beam on the image-forming surface. In a preferred embodiment of the luminaire, the collimating element and the focusing lens form an integrated whole. This results in a greater compactness of the luminaire. In an alternative embodiment of the luminaire, the focusing lens is embodied so as to be a Fresnel lens. The focusing lens preferably consists of a synthetic resin, such as PMMA or PC, the desired optical Fresnel structure being obtained by means of injection molding.

In a preferred embodiment, the luminaire also comprises a projection lens for projecting an image of the image-forming surface. Preferably, the projection lens is embodied so as to be a Fresnel lens. This leads to a more compact luminaire. Such a Fresnel lens is preferably made of a synthetic resin, for example PMMA or PC. To avoid lens errors, the projection lens is preferably embodied so as to be an aspherical lens. In an alternative embodiment, the projection lens comprises diffractive structures, which lead to a higher image quality (correction of lens errors).

These and other aspects of the invention will be apparent from and elucidated with reference to the embodiments described hereinafter.

BRIEF DESCRIPTION OF THE DRAWINGS

In the drawings.

The Figures are purely diagrammatic and not drawn to scale. Particularly for clarity, some dimensions are exaggerated strongly. In the Figures, like reference numerals refer to like parts whenever possible.

DESCRIPTION OF THE INVENTION

Figure 1:
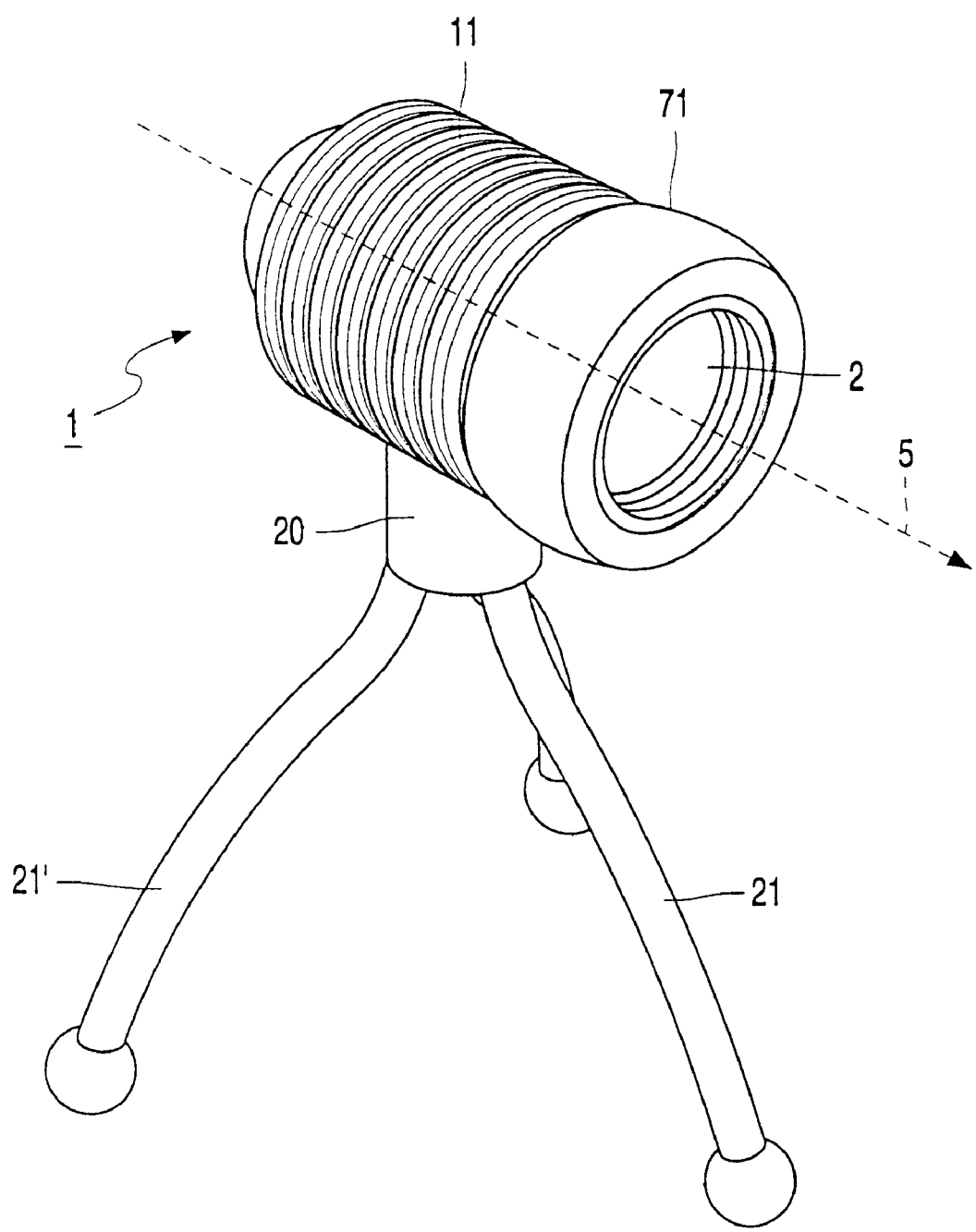
FIG. 1 is a perspective view of an example of a luminaire in accordance with the invention.

FIG. 1 is a diagrammatic, perspective view of an example of a luminaire for projecting an image by means of a light beam in accordance with the invention. The luminaire comprises a housing 1 having a light emission window 2 provided in an adjusting member 71, which can be moved with respect to the housing 1. In operation, the luminaire emits the light beam along the longitudinal axis 5. The housing is provided with cooling fins 11 and supported by a support 20, which rests on three flexible legs 21, 21' in this example. The luminaire may alternatively be suspended or provided with a lamp cap which is known per se, for example of the type E14 or E27.

Figure 2A:
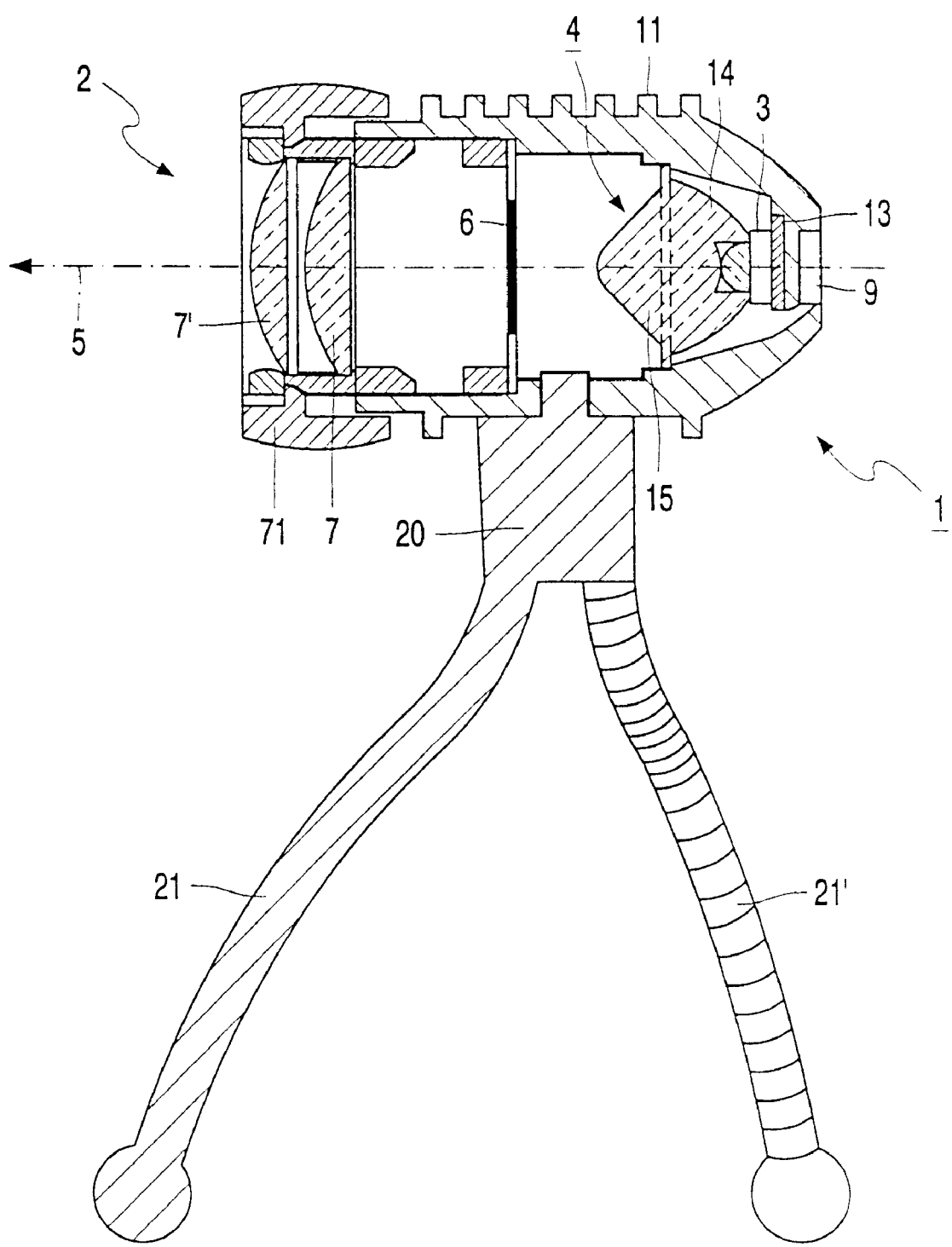
FIG. 2A is a sectional view of a luminaire in accordance with the invention, as shown in FIG. 1, partly in cross-section and partly in perspective.

FIG. 2A diagrammatically shows, partly in cross-section and partly in perspective, a sectional view of a luminaire in accordance with the invention as shown in FIG. 1. The housing 1 is provided with cooling fins 11 and supported by a support 20 which rests on flexible legs 21, 21'. The housing 1 further comprises an opening 9 for allowing passage of an electrical connection cable. The housing 1 also includes control electronics (not shown in FIG. 2A for the sake of clarity), which is necessary to operate the LED 3. If necessary, the control electronics may be situated outside the housing 1.

Figure 2B:
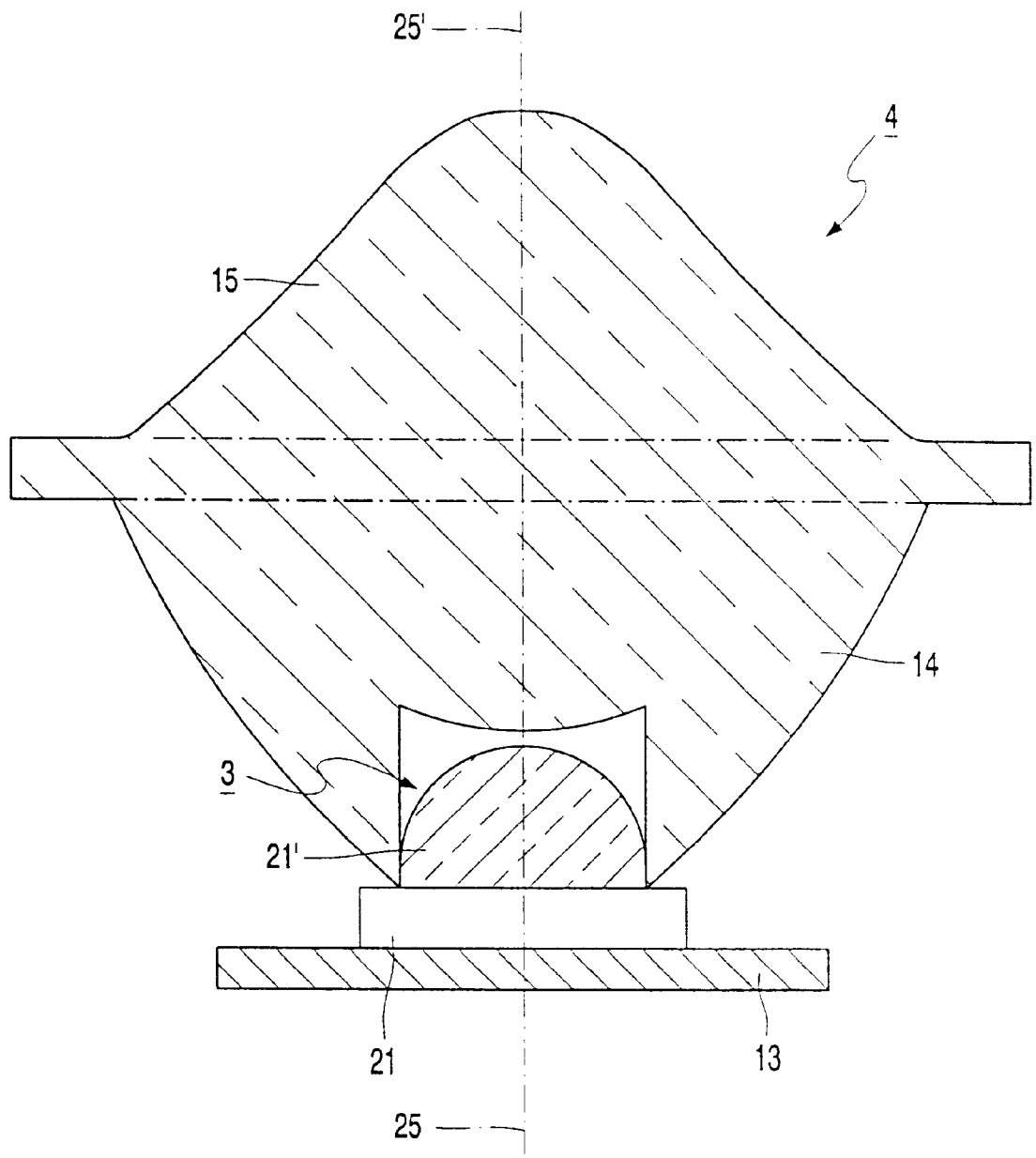
FIG. 2B is a cross-sectional view of a LED comprising an embodiment of a collimating element integrated with a projection lens.

The housing 1 accommodates a light source 3 and an optical system 4 for directing radiation to be generated by the light source 3 along the longitudinal axis 5 (see FIG. 2B). The housing 1 further accommodates an image-forming surface 6 which is placed in the light beam transversely to the longitudinal axis 5. The image-forming surface 6 is alternatively referred to as GOBO (an abbreviation used in the theater and movie world: "GO BlackOut"). A GOBO generally consists of a thin metal sheet which serves as a mask for selectively passing light, or it may alternatively be made of (colored) glass provided with an image. The image-forming surface 6 may also comprise a so-called Cookie (originating from the Greek word kukaloris), which causes light to be refracted. In general, a luminaire comprises a plurality of GOBOs mounted on rotatable transparent plates, and the luminaire images a different GOBO each time.

In accordance with the measure of the invention, the light source comprises a light-emitting diode 3 which is accommodated in the housing 1 of the luminaire. The optical system 4 comprises a collimating element 14 for collimating the light beam. In the example shown in FIGS. 2A and 2B, the integrated element 4 has a collimating function as well as a focusing function.

Since LEDs are used in the invented luminaire instead of the light sources known from the prior-art luminaire, it is favorable to manufacture the image-forming surface from an optically transparent synthetic resin comprising, for example, a diapositive, such as an advertising text and/or an image of a logo and/or a brand name of a company.

In the example of FIG. 2A, the housing comprises one LED 3 and one image-forming surface 6 associated therewith. In this manner, a very compact luminaire is obtained. The length of the housing 1 including the light emission window 2, measured along the longitudinal axis 5, ranges between 5 and 10 cm. The length of the known luminaire generally ranges from 30 to 100 cm.

To obtain a luminaire having a high light output, so-called power packages of LEDs can be used as the light source. For example, high-efficiency, high-output LEDs of the type "Barracuda" (Hewlett-Packard) may be used. The luminous flux per LED is 10 lm for the red LEDs and 13 lm for the green LEDs. The use of these high-efficiency, high-output LEDs has the specific advantage that the number of LEDs may be relatively small for a desired, relatively high light output. This contributes to the compactness and efficiency of the luminaire to be manufactured. In an alternative embodiment, "Prometheus" type LEDs (Hewlett-Packard) are used as the high-efficiency, high-output LEDs, the luminous flux per LED being 35 lm for the red LEDs and 30 lm for the green LEDs. By using one or more high-efficiency, high-output LEDs as the light source, luminaires are obtained which are daylight viewable and whose brightness is comparable to that of the known luminaire.

Preferably, the LED 3 is mounted on a metal-core printed circuit board 13. Preferably, the metal-core printed circuit board 13 is in contact with the metal housing 1 provided with cooling fins 11 via a heat-conducting connection. Such a heat-conducting connection is preferably brought about by connecting the MC-PCB 13 to the metal housing 1, either directly or via a metal plate. The heat generated in the LED or LEDs 3 can be dissipated by (thermal) conduction via the MC-PCB 13 to the housing 1 and the cooling fins 11, in which process heat dissipation to the environment takes place. This has the advantage that forced air cooling for dissipating heat, as employed in the known luminaire, is not necessary.

The optical system 4 in the luminaire, as shown in FIG. 2A, further comprises a focusing lens 15 for focusing the collimated light beam on the image-forming surface 6. In FIG. 2B, which shows the optical system 4 of FIG. 2A on an enlarged scale, a LED 3 is shown in combination with a collimating element 14 which is combined with a focusing lens 15 to form an integrated whole. The integrated element 4 has a collimating function as well as a focusing function. The LED 3 is provided on a MC-PCB 13, has an optical axis 25 and is composed of a body 21 for emitting light during operation. In the example shown in FIG. 2B, the body 21 of the LED 3 is provided with a light-transmitting envelope 21', for example in the form of a lens. The collimating element 14 and the focusing lens 15 jointly form the optical system 4 and have an optical axis 25', which coincides with the optical axis 25 of the LED 3. In an alternative embodiment of the luminaire, the collimating element is embodied so as to be a Fresnel lens (see FIG. 3B).

The luminaire shown in FIG. 2A further comprises a projection lens 7, 7' for projecting an image of the image-forming surface 6. In the example shown in FIG. 2A, two projection lenses 7, 7' are used, namely a first projection lens 7 which is in a fixed position with respect to the housing 1, and a second projection lens 7' which is mounted in an adjusting member 71 which is displaceably provided on the housing 1 (for example by a helical motion) so that the projection lens 7 can be moved along the longitudinal axis 5. In this manner, a sharp image of the image-forming surface 6 is obtained. In an alternative embodiment of the luminaire, the focusing lens is embodied so as to be Fresnel lens. Preferably, the focusing lens is made of a synthetic resin.

Figure 3A:
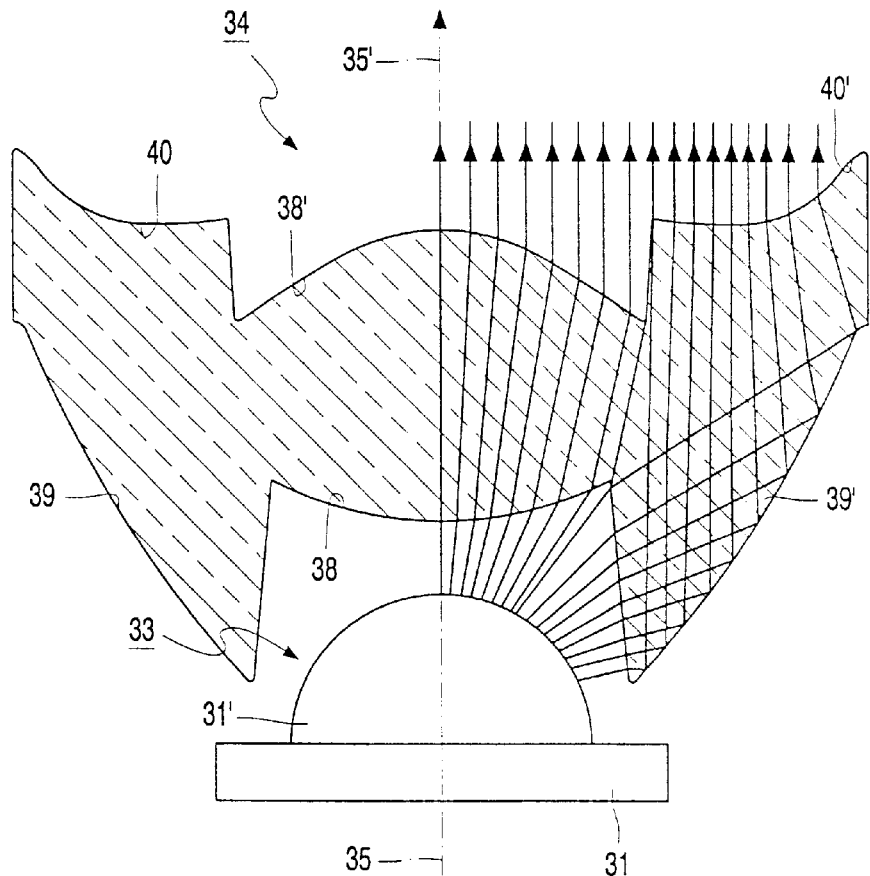
FIG. 3A is a cross-sectional view of a LED comprising an embodiment of a collimating element.

FIG. 3A is a cross-sectional view of a LED 33 with an embodiment of a collimating element 34 associated with said LED 33. The LED 33 has an optical axis 35 and is built up of a body 31 for emitting light during operation. In the example of FIG. 3A, the body 31 of the LED 33 is provided with a light-transmitting envelope 31', for example in the form of a lens. The collimating element 34 has an optical axis 35', which coincides with the optical axis 35 of the LED 33. The shape of the collimating element 34 is chosen to be such that light originating from the LED 33 is emitted by the optical system in a direction parallel to the optical axis 35' of the collimating element 34 (see the very diagrammatically shown light rays passing through the collimating element 34). Due to this measure, the intensity of the LED 33 is increased in the forward direction (parallel to the optical axis 35). To this end, surfaces 38, 38' of the collimating element 34 are curved such that light originating from the LED 33 and impinging on the surface 38 forms a parallel light beam after passing the surface 38', which light beam extends parallel to the optical axis 35' of the collimating element 34 (refraction). In addition, surfaces 39; 39' and associated surfaces 40; 40' of the collimating element 34 are curved such that light originating from the LED 33 and impinging on the surface 39; 39' is fully reflected in the direction of the surface 40; 40' and, after passing surface 40; 40', forms a parallel light beam extending parallel to the optical axis 35' of the collimating element 34 (total internal reflection). A reflective coating can thus be omitted.

Figure 3B:
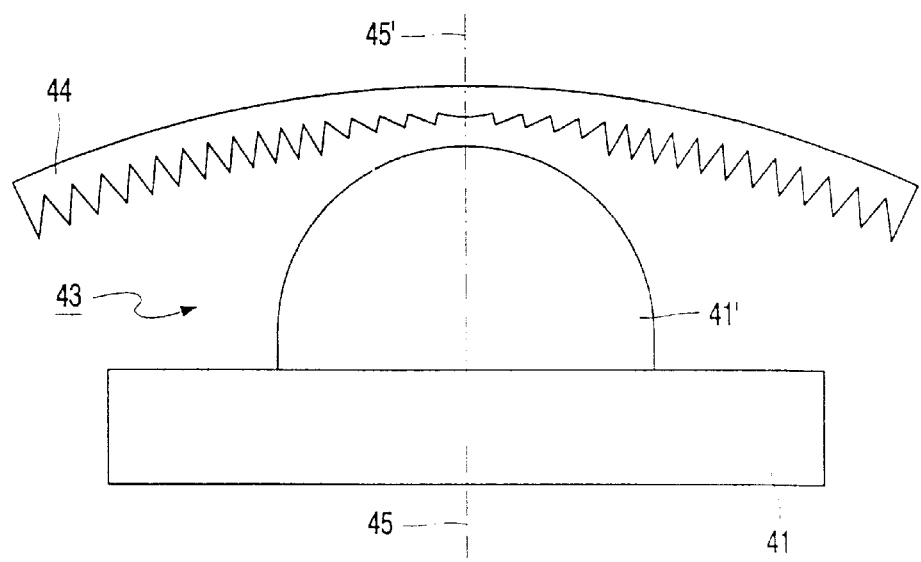
FIG. 3B is a cross-sectional view of a LED comprising an embodiment of a collimating element embodied so as to be a Fresnel lens.

FIG. 3B is a diagrammatic, cross-sectional view of an alternative embodiment of the luminaire comprising a LED 43 and a collimating element embodied so as to be a Fresnel lens 44. The LED 43 has an optical axis 45 and is built up of a body 41 for emitting light during operation. In the example of FIG. 3B, the body 41 of the LED 43 is provided with a light-transmitting envelope 41', for example in the form of a lens. The collimating element 44 has an optical axis 45', which coincides with the optical axis 45 of the LED 43. In this example, the collimating element 44 is embodied so as to be a Fresnel lens, so that light originating from the LED 43 passes through the optical system and is emitted in a direction parallel to the optical axis 45' of the collimating element 44.

It will be obvious that, within the scope of the invention, many variations are possible to those skilled in the art.

The scope of protection of the invention is not limited to the examples given hereinabove. The invention is embodied in each novel characteristic and each combination of characteristics. Reference numerals in the claims do not limit the scope of protection thereof. The use of the word "comprising" does not exclude the presence of elements other than those mentioned in the claims. The use of the word "a or "an" in front of an element does not exclude the presence of a plurality of such elements.

What is claimed is:

1. A luminaire for projecting an image by means of a light beam, comprising:
    a housing which accommodates a light source and an optical system for directing the radiation to be generated by the light source along a longitudinal axis,
    an image-forming surface which is to be placed in the light beam transversely to the longitudinal axis,
    the light source comprising at least one light-emitting diode,
    the optical system including a synthetic resin collimating element for collimating the light beam, and
    the light-emitting diode being mounted on a metal-core printed circuit board.

2. A luminaire as claimed in claim 1, wherein the light source is composed of a single light-emitting diode, the luminous flux of which is at least 5 lm during operation.

3. A luminaire as claimed in claim 1, wherein parts of the collimating element exhibit total internal reflection.

4. A luminaire as claimed in claim 1, wherein a surface of the collimating element facing away from the light-emitting diode is curved.

5. A luminaire as claimed in claim 1, wherein the optical system further comprises a focusing lens to focus the collimated light beam on the image-forming surface.

6. A luminaire as claimed in claim 5, wherein the collimating element and the focusing lens jointly form an integrated whole.

7. A luminaire as claimed in claim 5, wherein the focusing lens is a Fresnel lens.

8. A luminaire as claimed in claim 1, wherein the luminaire comprises a projection lens for projecting an image of the image-forming surface.

9. A luminaire as claimed in claim 8, wherein the projection lens is a Fresnel lens.

10. A luminaire as claimed in claim 1, wherein
    the housing is made of metal and provided with cooling fins, and
    in that the metal-core printed circuit board is in contact with the metal housing via a heat-conducting connection.

11. A luminaire as claimed in claim 1, wherein the luminaire comprises control electronics for changing the luminous flux of the light-emitting diode.

12. A luminaire as claimed in claim 1, wherein the collimating element is in contact with the light source.

13. A luminaire for projecting an image by a light beam, comprising:
    a housing having a light-emitting diode and an optical system for directing light generated by the light-emitting diode,
    an image-forming surface located along the light beam,
    said optical system including a collimating element for collimating the light and a focusing lens for focusing the light and forming the light beam,
    said collimating element being located between the light-emitting diode and the image-forming surface, and
    the light-emitting diode being mounted on a metal-core printed circuit board.

14. A luminaire as claimed in claim 13, wherein said collimating element has a first side facing said light-emitting diode and a second side facing away from said light-emitting diode and opposite said first side, said first side having a first portion with a first curvature and a second portion with a second curvature which is different from said first curvature.

15. A luminaire as claimed in claim 13, wherein said collimating element has a first side, said first side having a first portion with a first curvature and a second portion with a second curvature which is different from said first curvature.

16. A luminaire as claimed in claim 15, wherein said first side is facing said light-emitting diode, and wherein the collimating element has a second side opposite said first side and facing away from said light-emitting diode, said second side having a first portion with a first curvature and a second portion with a second curvature which is different from said first curvature.

17. A luminaire as claimed in claim 13, wherein parts of the collimating element exhibit total internal reflection.

18. A luminaire as claimed in claim 13, wherein the collimating element and the focusing lens jointly form an integrated whole.

19. A luminaire as claimed in claim 13, wherein the luminaire comprises control electronics for changing the luminous flux of the light-emitting diode.

20. A luminaire for projecting an image by a light beam, comprising:
    a housing having a light-emitting diode and an optical system for directing light generated by the light-emitting diode, and
    an image-forming surface located along the light beam,
    said optical system including a collimating element for collimating the light and a focusing lens for focusing the light and forming the light beam, and
    said collimating element being in contact with the light-emitting diode.

* * * * *